US012596587B2

(12) United States Patent
Xu et al.

(10) Patent No.: US 12,596,587 B2
(45) Date of Patent: Apr. 7, 2026

(54) CLOUD DISTRIBUTED DATABASE CAPACITY PLANNING AND ADJUSTMENT USING TIME-SERIES DATA ANALYSIS

(71) Applicant: Microsoft Technology Licensing, LLC, Redmond, WA (US)

(72) Inventors: Chengjie Xu, Suzhou (CN); Yongyu Chen, Nanjing (CN); Minming Guo, Shanghai (CN); Ge Shen, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 502 days.

(21) Appl. No.: 18/171,874

(22) Filed: Feb. 21, 2023

(65) Prior Publication Data

US 2024/0281297 A1     Aug. 22, 2024

(51) Int. Cl.
G06F 9/50 (2006.01)

(52) U.S. Cl.
CPC .......... G06F 9/5072 (2013.01); G06F 9/5011 (2013.01); G06F 9/5077 (2013.01)

(58) Field of Classification Search
CPC ................................................... G06F 9/5072
See application file for complete search history.

(56) References Cited

U.S. PATENT DOCUMENTS

| | | | | |
|---|---|---|---|---|
| 8,499,066 B1 * | 7/2013 | Zhang | .................... | H04L 47/83 |
| | | | | 709/200 |
| 9,501,330 B2 | 11/2016 | Mcgrath et al. | | |
| 10,438,092 B2 | 10/2019 | Lilley et al. | | |
| 10,489,215 B1 * | 11/2019 | Wen | ......................... | G06F 9/50 |

(Continued)

FOREIGN PATENT DOCUMENTS

| | | |
|---|---|---|
| CN | 108023834 A | 5/2018 |
| CN | 108039962 A | 5/2018 |

(Continued)

OTHER PUBLICATIONS

Andrews, et al., "How to choose between provisioned throughput and serverless", Retrieved From: https://learn.microsoft.com/en-us/azure/cosmos-db/throughput-serverless, Oct. 12, 2022, 3 Pages.

(Continued)

*Primary Examiner* — Charlie Sun

(57) ABSTRACT

Systems and methods are provided for implementing cloud distributed database capacity planning and/or adjustment, using time-series data analysis. In various embodiments, a computing system may be used to analyze collected throughput data associated with consumption of provisioned throughput resources of a distributed cloud database over one or more past periods by an entity. Based on the analysis, a set of predicted throughput data may be determined or generated for the entity over a future upcoming period. In (Continued)

100 some cases, based on a determination that adding physical partitions would be required, the computing system may adjust the set of predicted throughput data to reduce or minimize a number of physical partitions to be added. The provisioned capacity of the distributed cloud database may then be dynamically adjusted based at least in part on one of the unadjusted or adjusted set of predicted throughput data.

18 Claims, 6 Drawing Sheets

(56) References Cited

U.S. PATENT DOCUMENTS

| | | | | |
|---|---|---|---|---|
| 11,616,682 | B2 * | 3/2023 | Thampy | H04L 43/08 |
| | | | | 709/224 |
| 12,148,136 | B1 * | 11/2024 | Indeck | G06T 7/143 |
| 2014/0351285 | A1 | 11/2014 | Liu et al. | |
| 2023/0350717 | A1 * | 11/2023 | Neate | G06F 9/5027 |
| 2024/0118937 | A1 * | 4/2024 | Zong | G06F 9/505 |

FOREIGN PATENT DOCUMENTS

| | | |
|---|---|---|
| CN | 110933172 A | 3/2020 |
| CN | 111638959 A | 9/2020 |
| CN | 112328395 A | 2/2021 |
| CN | 113297268 A | 8/2021 |
| KR | 20190055613 A | 5/2019 |

OTHER PUBLICATIONS

Arroyo, et al., "How to monitor normalized RU/s for an Azure Cosmos DB container or an account", Retrieved From: https://learn.microsoft.com/en-us/azure/cosmos-db/monitor-normalized-request-units, Oct. 12, 2022, 10 Pages.

Chen, et al., "How to choose between standard (manual) and autoscale provisioned throughput", Retrieved From: https://learn.microsoft.com/en-us/azure/cosmos-db/how-to-choose-offer, Oct. 12, 2022, 9 Pages.

Higginson, et al., "Database workload capacity planning using time series analysis and machine learning", In Proceedings of the ACM SIGMOD International Conference on Management of Data, Jun. 14, 2020, pp. 769-783.

International Search Report and Written Opinion received for PCT Application No. PCT/US2024/015885, Jun. 7, 2024, 14 pages.

International Preliminary Report on Patentability (Chapter I) received for PCT Application No. PCT/US2024/015885, mailed on Sep. 4, 2025, 08 pages.

* cited by examiner

200

300

300'

400

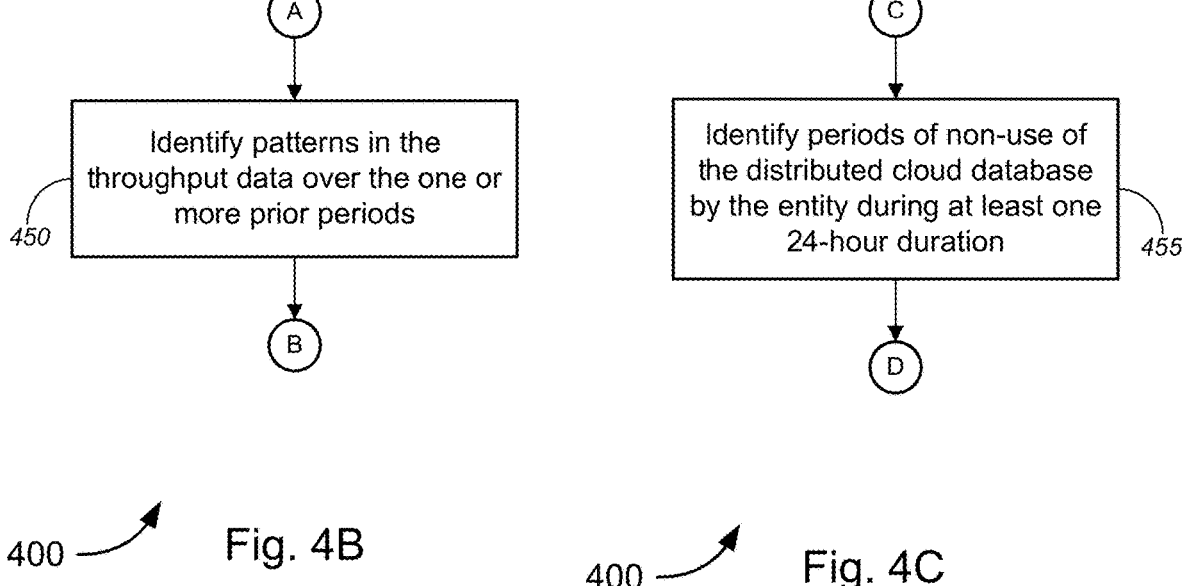
450
Identify patterns in the throughput data over the one or more prior periods
455
Identify periods of non-use of the distributed cloud database by the entity during at least one 24-hour duration
400 ——⟋   Fig. 4B
400 ——⟋   Fig. 4C

CLOUD DISTRIBUTED DATABASE CAPACITY PLANNING AND ADJUSTMENT USING TIME-SERIES DATA ANALYSIS

BACKGROUND

Cloud distributed databases continue to grow in popularity and use. Conventional provisioning methodologies leave significant unused database capacity or resources, which is compounded by the growth in popularity and use. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for refined prediction of throughput data that may be used for more accurately predicting usage of containers and/or databases of a cloud distributed database. Based on the refined prediction of the throughput data, provisioned capacity of the distributed cloud database may be dynamically adjusted. In this manner, the amount of unused database capacity or resources may be minimized, thereby freeing unused computing resources for use elsewhere and reducing costs. In some examples, the refined prediction process may include identification and filtering out of outlier data or values in collected throughput data. The refined prediction process may include analysis of past throughput data (e.g., throughput data for the past 30 days or more) for predicting the throughput over a future period (e.g., an upcoming week or more). In some instances, machine learning algorithms may be used for the outlier filtering process and/or for the refined prediction process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 4A-4C depict an example method for implementing cloud distributed database capacity planning and/or adjustment, using time-series data analysis, in accordance with various embodiments.

DETAILED DESCRIPTION OF CERTAIN EMBODIMENTS

Figure 1:
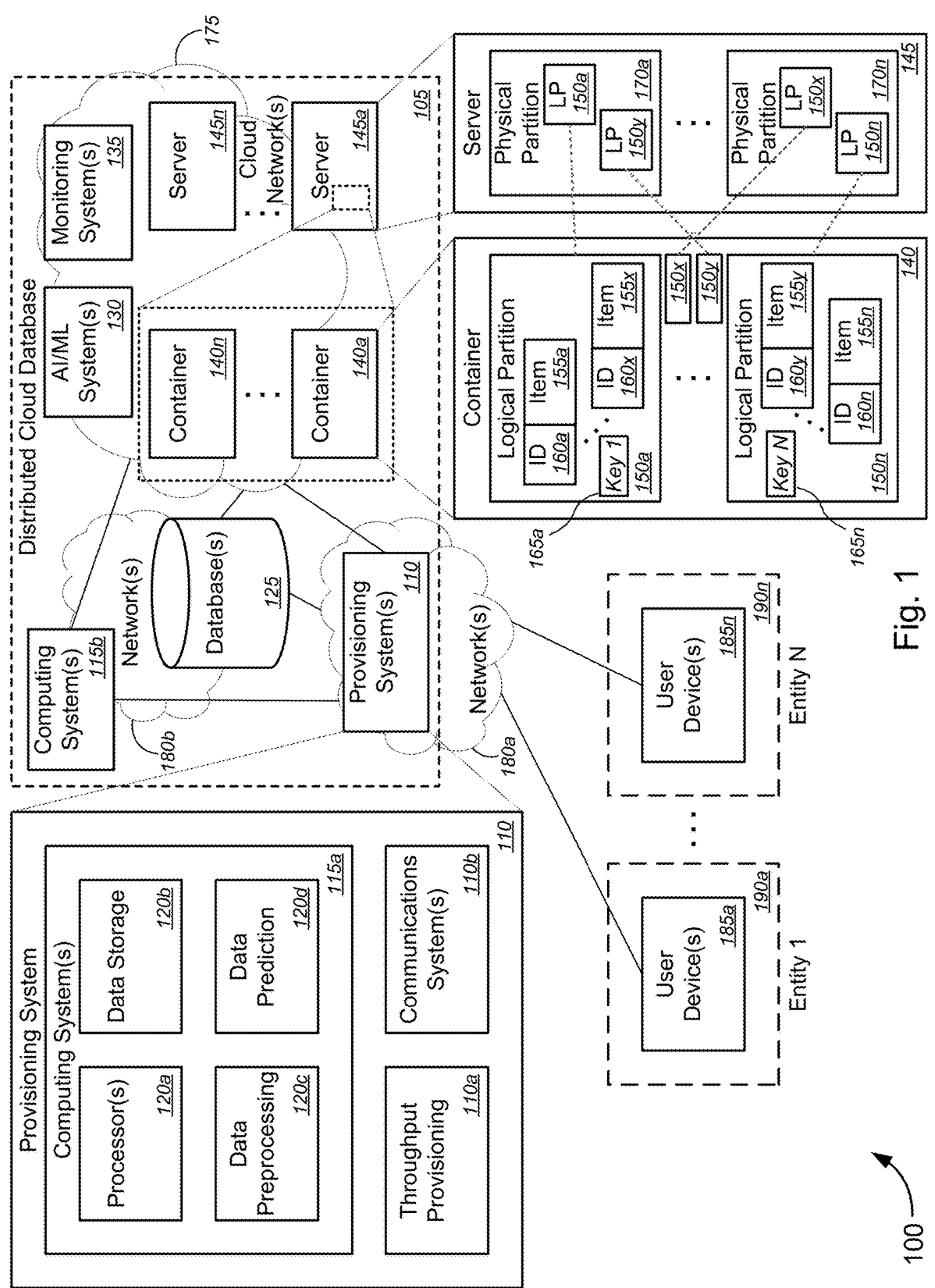
FIG. 1 depicts an example system for implementing cloud distributed database capacity planning and/or adjustment, using time-series data analysis, in accordance with various embodiments.

As briefly discussed above, a cloud distributed database may use predictive algorithms to predict future container or database usage and then provision a set capacity based on the predicted future use. In some cases, algorithms may be used to identify and filter out outlier data or values in prior throughput data to better refine the results of the predictive algorithms. For example, based on the prior month's throughput usage, throughput usage for the following week may be predicted, including peak usage for each day. An entity (e.g., a customer) may then be provisioned over a shortened time scale (e.g., each day during a period of non-use) with a throughput capacity (a number of throughput data units per second) based on the predicted peak usage for each day of the week. A period of non-use may refer to a period of time during which there is minimal use rather than entirely no use. For instance, the non-use period may be the period where use is below a non-use threshold. In this way, provisioning of the throughput capacity based on the predicted peak usage may be performed in a manner that limits, reduces, or minimizes impact to the entity. Such predictive provisioning conserves hardware resources that may then be distributed or used for other actions, such as providing capacity to other entities, or the like.

Among other things, the technology discussed herein differs from provisioning methodologies in which an entity (e.g., a customer) sets the throughput capacity to a single set amount over a longer period (e.g., over a month, an annual quarter, or a year). With such a provisioning methodology, the provisioned throughput capacity is often unused and squandered, resulting in a waste of dedicated computing hardware and/or resources. The technology discussed herein also differs from automatic scaling (or "auto-scaling"), in which capacity is adjusted automatically based on current capacity usage. In such an automatic scaling methodology, rather than relying on predictive algorithms, a reactive mode is utilized, which is resource intensive, and often increases costs.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-5 illustrate some of the features of a method, system, and apparatus for implementing cloud distributed database provisioning, and, more particularly, to methods, systems, and apparatuses for implementing cloud distributed database capacity planning and/or adjustment, using time-series data analysis, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing cloud distributed database capacity planning and/or adjustment, using time-series data analysis, in accordance with various embodiments. System 100 includes a distributed cloud database 105, which may include a provisioning system(s) 110. In some examples, the provisioning system(s) 110 may each include, without limitation, at least one of a computing system(s) 115a, a processor(s) 120a, a data storage device(s) 120b, a data preprocessing system(s) 120c, a data prediction system(s) 120d, a throughput provisioning system(s) 110a, and/or a communications system(s) 110b, and/or the like.

In some instances, the processor(s) 120a, the data storage device(s) 120b, the data preprocessing system(s) 120c, and the data prediction system(s) 120d, or the like, may be integrated within the computing system 115a and within the provisioning system 110. In other cases, one or more of the processor(s) 120a, the data storage device(s) 120b, the data preprocessing system(s) 120c, and/or the data prediction system(s) 120d, or the like, may be integrated within the provisioning system 110, but external to, yet communicatively coupled with, the computing system 115a, which may be integrated within provisioning system 110. In other cases, one or more of the processor(s) 120a, the data storage device(s) 120b, the data preprocessing system(s) 120c, and/or the data prediction system(s) 120d, or the like, may be external to, yet communicatively coupled with each of the provisioning system 110 and the computing system 115a, which may be integrated within provisioning system 110.

In some cases, the cloud distributed database 105 may further include, but is not limited to, at least one of a computing system(s) 115b, a database(s) 125, an artificial intelligence ("AI") or machine learning ("ML") system(s) 130, a monitoring system(s) 135, one or more containers 140a-140n (collectively, "containers 140"), and/or one or more servers 145a-145n (collectively, "servers 145"), and/or the like. As shown in FIG. 1, for example, each container 140 among the one or more containers 140a-140n (which may be created and/or stored in database(s) 125 or server(s) 145a-145n) may include, without limitation, one or one or more logical partitions 150a-150n (collectively, "logical partitions 150") that may be distributed throughout the container 140. Each logical partition 150 may be formed based on, or associated with, a partition key 165 among partition keys 165a-165n. Each logical partition 150 may contain (or store) data or item 155 (and corresponding identifier ("ID") 160). As shown in FIG. 1, data or items 155a-155x (and corresponding IDs 160a-160x) may be stored in logical partition 150a, while data or items 155y-

155n (and corresponding IDs 160y-160n) may be stored in logical partition 150n, or the like, with a<x<y<n, where a=1, and x, y, and n are integer numbers, or the like). In some examples, each database 125 among the database(s) 125 and/or each server 145 among the one or more servers 145a-145n may include, but is not limited to, one or more physical partitions 170a-170n (collectively, "physical partitions 170"). One or more logical partitions 150 may be mapped or hosted on one of the physical partitions 170 of a server 145 among the one or more servers 145a-145n. In some examples, the underlying data or item 155 itself may be stored in the physical partition(s) 170 of the server 145. For instance, as shown, e.g., in FIG. 1, logical partitions 150a and 150y may be mapped or hosted on physical partition 170a, while logical partitions 150x and 150n may be mapped or hosted on physical partition 170n, as denoted by the corresponding dotted lines between each logical partition 150 in container 140 and its mapped version in the corresponding physical partition 170.

In some instances, provisioning system(s) 110, computing system(s) 115b, database(s) 125, AI/ML system(s) 130, monitoring system(s) 135, the one or more containers 140, and/or the one or more servers 145 (collectively, "distributed cloud database components" or "components") may be disposed or located in any one or more of network(s) 175, 180a, and/or 180b, or the like, and each component may be communicatively coupled with one or more of the other components, either via wired connection(s) and/or via wireless connection(s), or the like (in some cases, using communications systems such as communications system(s) 110b of provisioning system(s) 110). According to some embodiments, networks 175, 180a, and 180b may each include, without limitation, at least one of a distributed computing network(s), such as the Internet, a private network(s), a commercial network(s), or a cloud network(s), and/or the like.

In some examples, system 100 may further include one or more user devices 185a-185n (collectively, "user devices 185"), which may be associated with corresponding entities 1 through N 190a-190n (collectively, "entities 190"). The entities 190 may represent different customers of the database service. In some instances, the user devices 185 may each include one of a desktop computer, a laptop computer, a tablet computer, a smart phone, a mobile phone, or any suitable device capable of communicating with networks 175, 180a, and/or 180b or with servers or other network devices within networks 175, 180a, and/or 180b, or via any suitable device capable of communicating with at least one of the distributed cloud database 105, the provisioning system(s) 110, the computing system(s) 115a or 115b, the monitoring system(s) 135, at least one of the one or more containers 140a-140n, and/or at least one of the one or more servers 145a-145n, and/or the like, via a web-based portal, an application programming interface ("API"), a server, a software application ("app"), or any other suitable communications interface, or the like (not shown), over networks 175, 180a, and/or 180b. In some cases, entities 190 may each include, without limitation, one of an individual, a group of individuals, a private company, a group of private companies, a public company, a group of public companies, an institution, a group of institutions, an association, a group of associations, a governmental agency, a group of governmental agencies, or any other suitable entity(ies) or their agent(s), representative(s), owner(s), and/or stakeholder(s), or the like.

In some embodiments, the distributed cloud database 105 is a system that provides users or entities with data storage services within a distributed server storage framework that spans at least the one or more cloud networks 175 (if not also networks 180a and/or 180b, or the like). Data 155 is stored in one or more containers 140, and more specifically in one or more physical partitions 170, which may be embodied by servers (e.g., servers 145a-145n) and/or data storage devices (e.g., database(s) 125; including non-transitory storage media including, but not limited to, a removable storage device(s), a non-removable storage device(s), RAM, ROM, electrically erasable programmable read-only memory ("EEPROM"), flash memory or other memory technology, CD-ROM, digital versatile disks ("DVD") or other optical storage, magnetic cassettes, magnetic tape, and/or magnetic disk storage or other magnetic storage devices), or the like. Logical partitions 150 are used to group data sharing the same partition key 165, which is an identifier or property whose value is used to route data to the partition to be written, updated, or deleted. Each container 140 may be a logical packaging in which software applications can be abstracted from the environment in which they are actually run or executed, by holding all the components (e.g., files, libraries, and environment variables) necessary for running or executing the software applications. In the case of the distributed cloud database 105, each container 140 is configured to store data, and allow for management of the stored data, or otherwise provide for database operations.

In some examples, database operations may include at least one of reading data, inserting data, upserting (or updating and inserting) data, deleting data, querying data, and/or the like. In some cases, database operations may be normalized and may be expressed herein as "throughput data unit," "throughput data," or "throughput resources," or the like, each of which may serve as performance currency abstracting the plurality of system resources including, but not limited to, (a) central processing unit ("CPU") or other processor usage, (b) memory usage, and/or input/output operations ("IOps"), and/or the like. In some cases, a single point read (i.e., fetching a single item by its identifier ("ID") and partition key value) for a 1 KB item may equal 1 throughput data unit ("TDU"). Herein, "throughput data unit," "throughput data," or "throughput resources" may refer to one or more of request units or requesting units ("RUs"), write capacity units ("WCUs"), write request units ("WRUs"), read capacity units ("RCUs"), read request units ("RRUs"), or node hours, and/or the like. In some examples, "throughput amount" (and, in some cases, "throughput data") may refer to throughput data units per second (or "TDU/s").

In some embodiments, each container 140 may be created within a database 125 or a server 145. When storing data item 155 (which may also be referred to herein as "data 155" or "item 155"), an ID 160 is assigned to, or associated with, the item 155, and one or more items 155 may be logically grouped or identified by a partition key 165, with each item 155 and the corresponding ID 160 being stored in a logical partition 150. Each logical partition 150 is associated with a partition key 165 that may be associated with each item 155 in said logical partition 150 (and, in some cases, in the corresponding container 140). In some instances, a logical partition 150 may be formed based on the value of the partition key 165. All items 155 in a logical partition 150 have the same partition key value. Each ID 160 is unique within a logical partition 150. Combining the partition key 165 and the ID 160 creates an index for the item 155, which uniquely identifies the item 155.

In some embodiments, a container 140 may be scaled by distributing data 155 and throughput (which is described above) across physical partitions 170. While logical partitions 150 may be managed by a user or entity 190 (e.g., by selecting a partition key 165), physical partitions 170 are an internal implementation of the distributed cloud database 105 and are managed by at least one of distributed cloud database 105, provisioning system(s) 110, or computing system(s) 115a or 115b, or the like. According to some embodiments, any number of logical partitions 150 may be created in a container 140, with each logical partition 150 being capable of storing up to a first data storage capacity (e.g., 20 GB; in some cases, less than 20 GB; in some cases, greater than 20 GB). In some examples, monitoring system(s) 135 may be used to monitor whether a logical partition's size is approaching the first data storage capacity. The number of physical partitions 170 in a container 140 depends on the following physical partition amount conditions: (i) the total data storage, with each physical partition 170 being capable of storing up to a second data storage capacity (e.g., 50 GB; in some cases, less than 50 GB; in some cases, greater than 50 GB); and (ii) an amount of throughput provisioned, with each physical partition 170 being capable of providing a throughput amount of up to a throughput limit (e.g., 10,000 throughput data units per second; in some cases, less than 10,000 throughput data units per second; in some cases, greater than 10,000 throughput data units per second). Because each logical partition 150 is mapped to only one physical partition 170, each logical partition 150 may also have the same throughput limit as each physical partition 170. Monitoring system(s) 135 may be used to provide entities 190 (via corresponding user devices 185) with a metrics view to monitor accounts associated with the entities. In some cases, the metrics view may provide throughput data or throughput metrics, which may include a normalized throughput consumption metric between 0% and 100% (such as shown, e.g., in FIGS. 3A and 3B) that may be used to help measure utilization of provisioned throughput on a database or container.

In operation, at least one of distributed cloud database 105, provisioning system(s) 110, computing system(s) 115a or 115b, and/or processor(s) 120a (collectively, "system" or "computing system") may perform operations including collecting (historical) throughput data associated with consumption of provisioned throughput resources of at least one of a distributed cloud database (e.g., distributed cloud database 105) or a container (e.g., container 140a) of the distributed cloud database over one or more prior periods by an entity (e.g., entity 190a) using a monitoring system (e.g., monitoring system(s) 135). The operations may further include preprocessing (e.g., using data preprocessing system(s) 120c) the (historical) collected throughput data to identify and filter out outlier data to generate preprocessed data.

Merely by way of example, in some cases, the collected (historical) throughput data may include, without limitation, at least one of: throughput data for a container of the distributed cloud database that is associated with the entity; consumption data for the container that is associated with the entity; current throughput capacity configuration on the container that is associated with the entity; actual database usage percentage per minute per container that is associated with the entity; maximum aggregation of actual container usage percentage per minute that is associated with the entity; throughput data for the distributed cloud database that is associated with the entity; consumption data for the distributed cloud database that is associated with the entity; current throughput capacity configuration on a single database of the distributed cloud database that is associated with the entity; actual database usage percentage per minute per database that is associated with the entity; maximum aggregation of actual database usage percentage per minute that is associated with the entity; normalized actual throughput data for the container that is associated with the entity; normalized actual throughput data for the distributed cloud database that is associated with the entity; a number of containers in the distributed cloud database that are assigned to the entity; normalized actual throughput data for an account that is associated with the entity; a maximum throughput capacity per physical partition; and/or the like.

The operations may further include, based on analysis of preprocessed data, determining, using a data prediction system (e.g., using data prediction system(s) 120*d*), a set of predicted throughput data for the entity over a future period. In some cases, determining the first set of predicted throughput data may be based on analysis of the collected throughput data without first preprocessing the data. In some examples, smoothing operations may be performed on the preprocessed data to generate smoothed preprocessed data, and determining the set of predicted throughput data may be based on analysis of the smoothed preprocessed data.

The operations may further include dynamically adjusting, using a throughput provisioning system (e.g., throughput provisioning system 110*a*), provisioned capacity of the distributed cloud database that is assigned to the entity, by dynamically changing the provisioned throughput resources of the distributed cloud database for the entity over the future period, based at least in part on the set of predicted throughput data. In some embodiments, dynamically changing the provisioned throughput resources of the distributed cloud database for the entity over the future period may include, but is not limited to, changing the provisioned throughput resources that are assigned to the entity by performing at least one of: increasing a number of containers (e.g., containers 140*a*-140*n*); increasing a number of logical partitions (e.g., logical partitions 150*a*-150*n*); increasing a number of physical partitions (e.g., physical partitions 170*a*-170*n*); decreasing the number of containers; decreasing the number of logical partitions; decreasing the number of physical partitions; distributing capacity across two or more logical partitions; distributing capacity across two or more physical partitions; distributing capacity across a combination of the containers, the logical partitions, and the physical partitions; and/or the like. In some instances, the operations may further include identifying periods of non-use of the distributed cloud database by the entity during at least one 24-hour duration, and dynamically changing the provisioned throughput resources of the distributed cloud database for the entity over the future period may be performed once per day during one of the identified periods of non-use of the distributed cloud database by the entity.

In some embodiments, at least one of analyzing the collected throughput data or preprocessing the analyzed collected throughput data to identify and filter out outlier data is performed using at least one machine learning algorithm (e.g., using AI/ML system(s) 130, or the like). These and other functions of the system 100 (and its components) are described in greater detail below with respect to FIGS. 2, 3A, 3B, and 4A-4C. For example, data application as described below with respect to FIGS. 3A and 3B and the first through seventh scenarios therein may be applied with respect to the operations described above with respect to FIG. 1.

Figure 2:
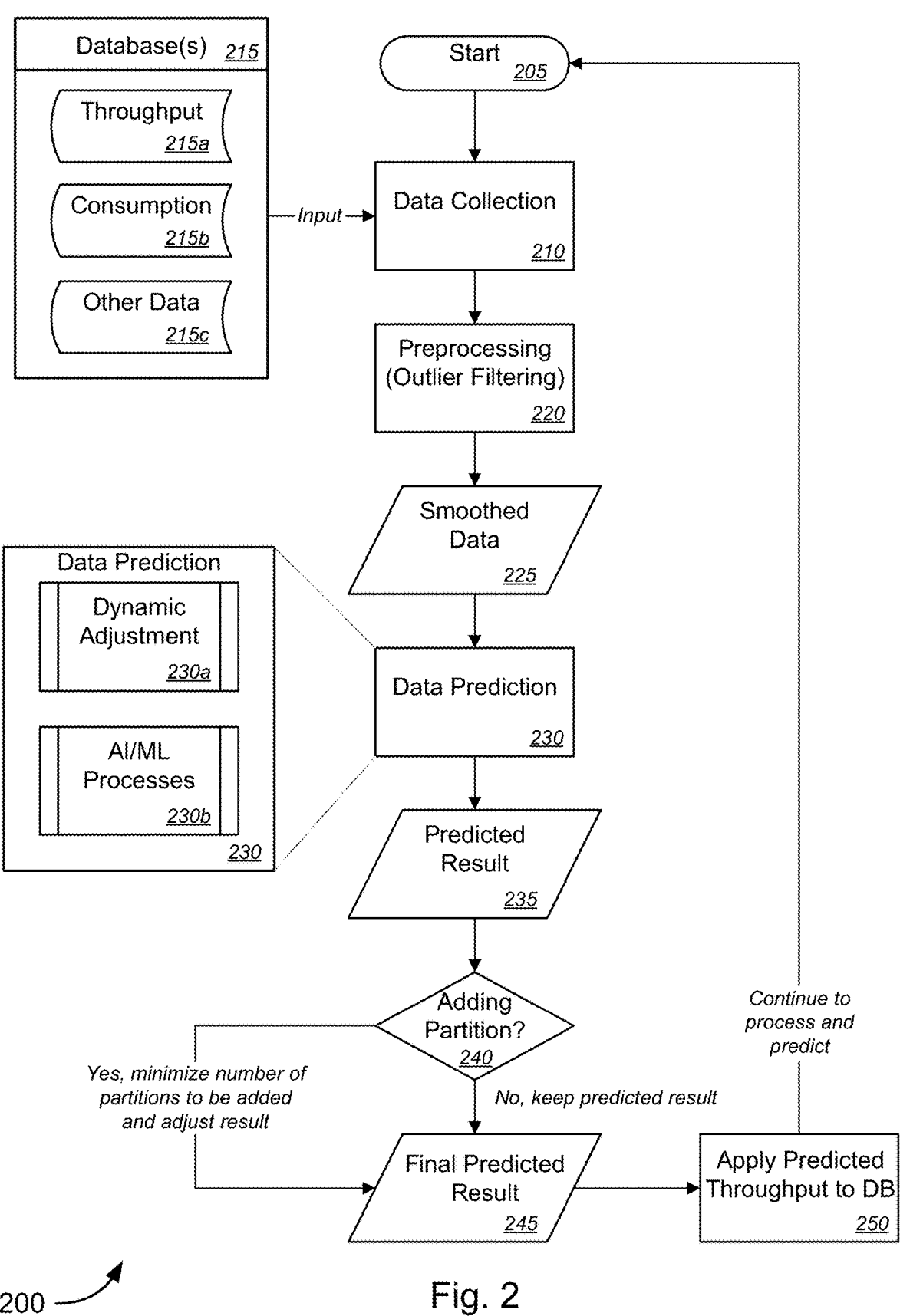
FIG. 2 is a block diagram illustrating an example data flow for implementing cloud distributed database capacity planning and/or adjustment, using time-series data analysis, in accordance with various embodiments.

FIG. 2 is a block diagram illustrating an example data flow 200 implementing cloud distributed database capacity planning and/or adjustment, using time-series data analysis, in accordance with various embodiments. In this approach, the process starts at block 205. Data collection is performed at block 210, at which point at least one of throughput data 215*a*, consumption data 215*b*, and/or other data 215*c* may be inputted, received, or collected from database(s) 215. At block 220, preprocessing is performed on the collected data to filter out outlier data to generate preprocessed data. In some cases, the preprocessed data may undergo smoothing operations to produce smoothed data 225.

Data prediction is performed, at block 230, on the collected data, which may have been preprocessed and/or smoothed. In some examples, performing data prediction may include performing sub-processes including at least one of dynamic adjustment calculations 230*a* and/or AI/ML processes 230*b* for producing throughput data results 235 based on the preprocessed and/or smoothed data 225. In this manner, this process can adjust throughput dynamically based on its past workloads, which includes data collection and data prediction. At block 240, a determination may be made as to whether the predicted throughput data results 235 require adding physical partitions, which may result in lower performance (e.g., due to a slowdown in the query process and/or the query response, or due to the warming up and/or initialization of the new partition(s)), or the like. If the predicted throughput data results 235 do not require adding physical partitions, the predicted throughput data results 235 are kept or used as the final predicted result 245. If the predicted throughput data results 235 require adding physical partitions, the predicted throughput data results 235 are adjusted to reduce or minimize a number of physical partitions to be added (thereby reducing or minimizing impact of added physical partitions), to produce final predicted result 245. The final predicted result 245 may be applied to provisioning throughput for the cloud distributed database, at block 250. Thereafter, the process may be repeated over time, by returning to the start at block 205, to continue to process the collected data and to predict throughput data results.

In some examples, data that may be collected to obtain predicted capacity values and throughput suggestions may include the following (which are listed in reference to a single database for simplicity of description): (1) current capacity ("$R_{capacity}$") configuration on a single database (e.g., throughput amount, as described above with respect to FIG. 1); (2) at least 30 days' data of actual usage percentage ("$N_{capacity}$") per minute level amount with maximum aggregation (e.g., using aggregation of maximum values) (e.g., the normalized throughput consumption metric, ranging from 0 to 100, as described above with respect to FIG. 1); (3) number of containers ("$C_{db}$") in a single database; (4) maximum $R_{capacity}$ value ("$R_{max}$") for a single physical partition (e.g., 10,000 throughput data units per second (or greater), as described above with respect to FIG. 1). For multiple partitions, the per-partition throughput amount $R_{capacity}'$ is defined by $R_{capacity}/P$ each partition having the same per-partition throughput amount $R_{capacity}'$. In the case that the per-partition throughput amount $R_{capacity}'$ exceeds $R_{max}$, an additional physical partition will be added, and the data will be split into P+1, where P is the number of partitions, in which case the throughput amount $R_{capacity}'$ would be divided equally with each physical partition having a throughput amount of $R_{capacity}'/P+1$.

These and other functions of the example 200 (and its components) are described in greater detail herein with respect to FIGS. 1, 3A, 3B, and 4A-4C. For example, data application as described below with respect to FIGS. 3A and 3B and the first through seventh scenarios may be applied with respect to the processes of FIG. 2.

Figures 3A, 3B:
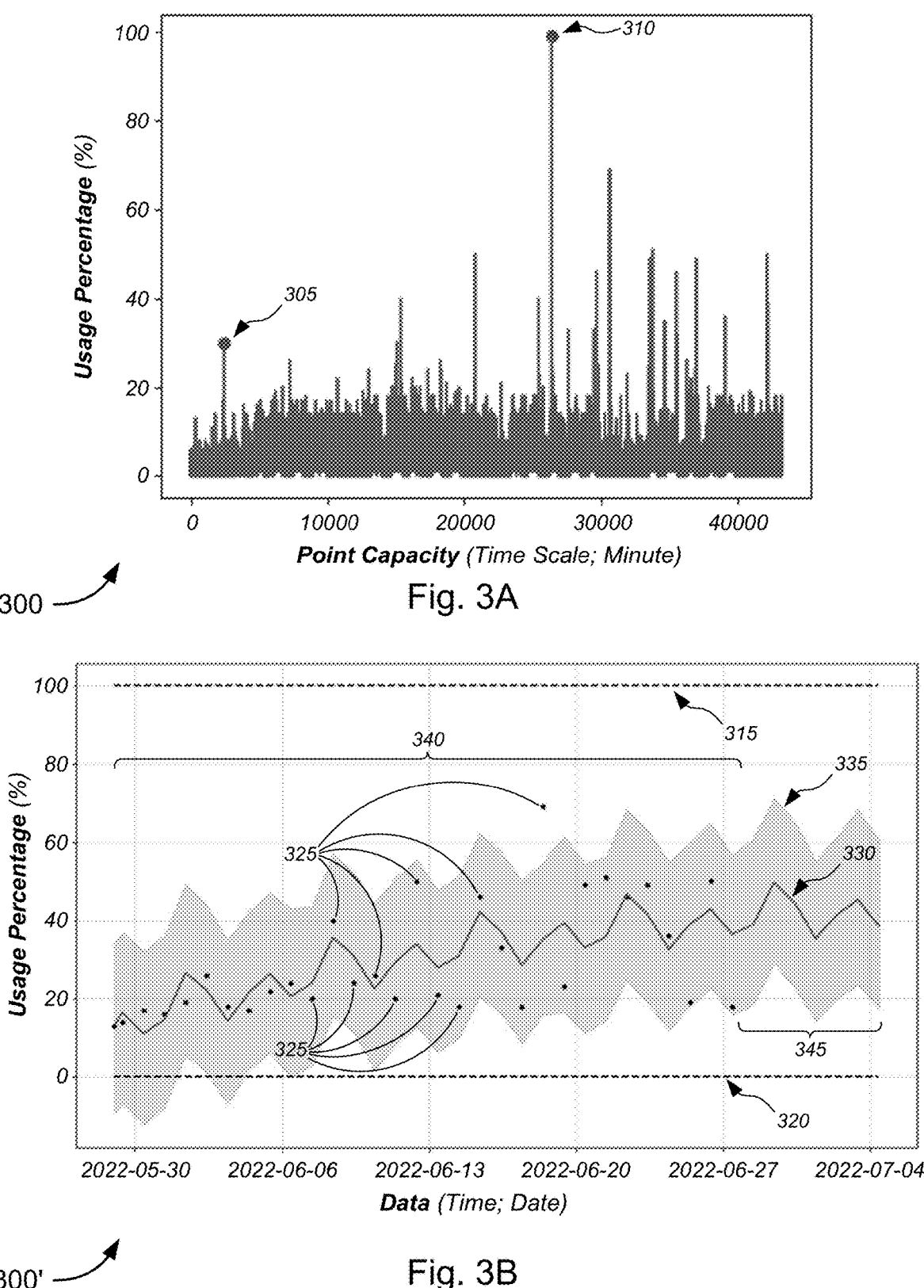
FIG. 3A is a graphical diagram depicting an example data graph in which outlier data has been identified and highlighted, as part of implementing cloud distributed database capacity planning and/or adjustment, using time-series data analysis, in accordance with various embodiments.
FIG. 3B is a graphical diagram depicting an example graphical representation of prediction of throughput data based on historical throughput data associated with consumption of provisioned throughput resources of a distributed cloud database, as part of implementing cloud distributed database capacity planning and/or adjustment, using time-series data analysis, in accordance with various embodiments.

FIGS. 3A and 3B depict graphical representations showing outlier identification and throughput data prediction, respectively, in accordance with various embodiments. FIG. 3A is a graphical diagram depicting an example data graph 300 in which outlier data 305, 310 has been identified and highlighted, as part of implementing cloud distributed database capacity planning and/or adjustment, using time-series data analysis. FIGS. 3A and 3B depict metrics views that include a normalized throughput consumption metric or usage percentage between 0% and 100% that may be used to help measure utilization of provisioned throughput on a database or container. The point capacity represents a data point at a particular time scale that may be selected by the entity, with the number of data points being defined by the following point capacity equation:

$$\text{Point}_{capacity} = \text{Scale} \times 24 \times 30, \qquad \text{(Eqn. 1)}$$

where "24" represents the number of hours in a day, "30" represents the number of days, and scale equals "1" for 1-hour intervals for data collection, "12" for 5-minute intervals for data collection, or "60" for 1-minute intervals for data collection, and so on.

Referring to FIG. 3A, the graph 300 shows the results based on total values per database where scale is 60 (representing 1-minute intervals in this case), resulting in a $\text{Point}_{capacity}$ of 43,200. In this case, maximum aggregation is used in which maximum values are aggregated within the time scale (in this case every minute) and split by each database. Relative extrema of data may then be calculated (e.g., using argrelextrema from scipy.signal algorithms). In some cases, minimum distance algorithms may be used as the filter to detect outlier values. In some instances, the data may be assumed to be seasonal, periodic, or cyclical per week (e.g., with particular patterns corresponding to particular days in a week). The process for identifying and filtering out outlier values may utilize a few parameters, including, but not limited to, comparator (e.g., comparator=np.greater_equal) and order (e.g., order=scale× 24×7). In some examples, the process for identifying (and filtering out) outlier values may include identifying patterns in the throughput data over the one or more prior periods and identifying outlier data that do not fit the pattern. The patterns may include weekly patterns, patterns for particular days of a week, patterns for particular hours in a day, patterns for particular weeks in a month, patterns for particular months of a year, or patterns for particular annual quarters in the year. The prior periods may each include one week, two weeks, three weeks, four weeks, a 30-day period, one month, two months, a 60-day period, three months, a 90-day period, one annual quarter, a half year, three annual quarters, a year, or a repeating interval period.

For instance, over a 30-day or month-long prior period, weekly patterns may be identified, and data from one week within the prior period may be compared with data from other weeks, and any (maxima or minima) extrema values that do not fit those patterns may be identified as outlier data that may be removed prior to determining the predicted throughput data. In some examples, any candidate outlier data points may be compared with corresponding data 7 days before and 7 days after the candidate outlier data point (or corresponding time interval), which may be referred to herein as cyclical or seasonal patterns. If it is determined that the candidate outlier data point does not fit or match the seasonal patterns (e.g., if the usage percentage for the candidate outlier data point exceeds a determined (minimum) distance or other metric (e.g., 20, 30, 40, 50, 60, 70, 80, or 90%, or a range of distance between 20 and 99%, or the like) compared with the usage percentage for the seasonal patterns), then the candidate outlier data may be confirmed as an outlier data that should be removed prior to data prediction. In some examples, if data peaks are present in the seasonal patterns corresponding to the candidate outlier data point, then even if the usage percentage exceeds a minimum distance or other metric compared with the usage percentage of the corresponding data peaks in the seasonal patterns, the candidate outlier data point may still be valid and meaningful, and may be kept rather than confirmed as an outlier data point. In the case of FIG. 3A, the outlier values are data point 305 (collected at time interval #2451 on 530/3022 at 6:43 a.m.) with a value of 30% and data point 310 (collected at time interval #26376 on 6/15/3022 at 9:28 p.m.) with a value of 99%. These data points 305 and 310 have been determined to not fit or match with the weekly patterns (i.e., the corresponding 7-day before and 7-day after the data points). The preprocessing of the data with the technology discussed herein removes these outlier values from the collected data to achieve more accurate or relevant prediction result. Although these examples are based on weekly patterns, the various embodiments are not so limited, and any of the other patterns or seasonal patterns may be used for outlier data identification and/or filtering.

According to some embodiments, identifying and/or filtering out outlier data (including identifying or confirming candidate outlier data) may include, but is not limited to, performing at least one of: minimum distance ("MD")-based filtering to compare and filter out outlier values; kernel density estimation ("KDE")-based filtering to smooth out outlier values; moving average ("MA")-based filtering to smooth out outlier values; Kalman filtering or linear quadratic estimation ("LQE")-based filtering to filter out outlier values; and/or the like. In some cases, MD-based filtering may be used to compare and filter out, from the analyzed collected (historical) throughput data, identified minimum or maximum extrema values whose difference values with adjacent minimum or maximum extrema values exceed a predetermined distance value. These identified minimum or maximum extrema values correspond to the outlier values to be filtered out. In some instances, KDE-based filtering may be used to smooth out outlier values based on application of kernel smoothing of the analyzed collected historical throughput data and probability density estimation of data after kernel smoothing. In some examples, MA-based filtering may be used to smooth out outlier values based on average values of a series of subsets of the analyzed collected historical throughput data, the series of subsets including an initial subset of the analyzed collected (historical) throughput data within a window having a subset size, and at least one subsequent subset of the analyzed collected (historical) throughput data that is defined by the window being shifted along an adjacent subset by less than the subset size (e.g., shifting by one or more data points, but less than the subset size). In some cases, Kalman filtering or LQE-based filtering may be used to filter out outlier values based on a series of measurements observed over time, including statistical noise and other inaccuracies, that are used to estimate a joint probability distribution over the variables for each timeframe. In some instances, LQE-based filtering may use weighted averages to update estimates of state variables (along with their uncertainties) based on observation of next measurements (that include error, such as random noise, or the like), and, in some examples, may identify and filter out the outlier values in a recursive manner based on such techniques. In some embodiments, at least one of analyzing the collected throughput data or preprocessing the analyzed collected throughput data to identify and filter out outlier data is performed using at least one machine learning algorithm.

FIG. 3B is a graphical diagram depicting an example graphical representation 300' of prediction of throughput data based on historical throughput data associated with consumption of provisioned throughput resources of a distributed cloud database, as part of implementing cloud distributed database capacity planning and/or adjustment, using time-series data analysis. To predict throughput values for the next 7 days, an AI or ML time-series model (e.g., a Prophet model configured as a procedure for forecasting time series data based on an additive model in which non-linear trends may be fitted with yearly, weekly, and/or daily seasonality, plus holiday effects) may be used to predict the values, and FIG. 3B depicts the results of the predicted values. With reference to the example of FIG. 3B, the prediction aims to identify a maximum value of each day in the next (or future) 7 days (after 2022 Jun. 27 in FIG. 3B). To that end, the general steps may include, without limitation, filtering to remove outlier values in the manner as described above with respect to FIGS. 1, 2, and 3A, and reducing noise while keeping only maximum values for each day. For the prediction process for the non-limiting example of FIG. 3B, some parameters of the AI/ML time-series model are set as follows: (a) the growth is set to "logistic"; and (b) the interval width is set to 0.95 (indicating 95% uncertainty interval). The various embodiments are not limited to these parameters. For the logistic growth, capacity and floor values (denoted in FIG. 3B by the dashed lines 315 and 320, respectively) are set along with the $N_{capacity}$ values, in this case, 100 and 0, respectively.

In FIG. 3B, the black points denote actual monitored (or collected) data points 325 in the prior period, while the line 330 denotes a trend line, and the shaded area 335 extending above and below the trend line 330 denotes an uncertainty interval. Based on the analysis and prediction, the predicted maximum values of $N_{capacity}$ for each day of the next 7 days (denoted in FIG. 3B by the area labeled with the reference numeral 345), based on the collected maximum values 325 in the preceding 30-day window (denoted in FIG. 3B by the area labeled with the reference numeral 340), is shown in the Table 1 below.

As shown in Table 1 above, the maximum predicted value (or usage percentage) for the next week is 64.49%, which corresponds to the maximum portion of the uncertainty interval 335. The other predicted values in Table 1 correspond to the corresponding maximum portion of the uncertainty interval 355 for the corresponding date.

A threshold that prevents capacity from reaching percentages that may come dangerously close to exceeding the physical limits of the partition. The threshold range may be from 0-100 with lower values being more conservative. Assuming the current capacity is $R_{capacity}$, and Threshold is the above-discussed threshold (ranging from 0 to 100), the predicted throughput amounts $R_{prediction}$ may be obtained (and are shown in Table 1 above under "Predicted Throughput") based on the following:

$$\frac{Threshold}{R_{capacity} \times Threshold} = \frac{N_{capacity}}{R_{prediction} \times Threshold} \qquad \text{(Eqn. 2)}$$

By adjusting the $R_{capacity}$ value for each day of the next 7 days to the $R_{prediction}$ or Predicted Throughput values (as shown in Table 1), 29% of the hardware resources can be conserved compared with the previous $R_{capacity}$ configuration, as shown in Table 1 above.

In some embodiments, data application may be implemented for the following non-limiting scenarios. In a first scenario, if the number of containers $C_{db}$ is less than the maximum number of containers $C_{max}$ for a single database (e.g., 25 containers), and all the containers share the current capacity $R_{capacity}$, and there is a single physical partition (i.e., P=1), the prediction values or results $R_{prediction}$ from the above-mentioned step may be applied. It will not affect database amount changes if the new predicted values $R_{prediction}$ are all lower than the $R_{capacity}$. If any of the new predicted values $R_{prediction} > R_{capacity}$ and $R_{prediction} < R_{max}$, the $R_{capacity}$ configuration may still be safely increased. If any of the new predicted values $R_{prediction} > R_{max}$, when the $R_{capacity}$ is increased, the number of physical partitions P will be increased by 1 for each $R_{max}$. To guarantee that the $R_{capacity}$ configuration of the original number of physical partitions P will not be decreased, $R_{capacity} \times Threshold$ may be set as the minimum value for each physical partition. Thus, the new $R_{capacity}$ setting for the database should be $R_{capacity} \times Threshold \times (P+1)$. For example, if the $R_{capacity}=10,000$ throughput data units per second (TDU/s) and Threshold=80%, then the new throughput setting should be 16,000 TDU/s.

TABLE 1

| Predicted throughput values for future period 345 (e.g., next (future) 7 days following the 30-day period 340 during which data was collected) | | | | | |
|---|---|---|---|---|---|
| Data (Date; Time) | Predicted Values (%) | Predicted Throughput (TDU/s) | Original Throughput (TDU/s) | Saved Throughput (TDU/s) | Saved Percentage (%) |
| Jun. 28, 2022 9:59 | 52.93 | 6615.82 | 10000 | 3384.18 | 33.84 |
| Jun. 29, 2022 9:59 | 64.49 | 8061.54 | 10000 | 1938.46 | 19.38 |
| Jun. 30, 2022 9:59 | 58.76 | 7345.49 | 10000 | 2654.51 | 26.55 |
| Jul. 1, 2022 9:59 | 49.71 | 6213.74 | 10000 | 3786.26 | 37.86 |
| Jul. 2, 2022 9:59 | 55.15 | 6893.62 | 10000 | 3106.38 | 31.06 |
| Jul. 3, 2022 9:59 | 60.19 | 7524.26 | 10000 | 2475.74 | 24.76 |
| Jul. 4, 2022 9:59 | 53.72 | 6715.49 | 10000 | 3284.51 | 32.85 |
| | | 49369.95 | 70000 | 20630.05 | 29.47 |

In a second scenario, which differs from the first scenario in that P is greater than 1, if $R_{max} \times (P-1) \leq R_{capacity} \leq R_{max} \times P$, and each partition has equal $$R'_{capacity} = \frac{R_{capacity}}{P},$$

one has to predict $R_{prediction}$ values on each physical partition and to take the maximum value as the $R_{prediction}'$. In such a case, the new $R_{capacity}'$ setting on the database may be calculated as $R_{capacity}' = R_{prediction}' \times P$. If $R_{capacity}' \leq R_{max} \times P$, then $R_{capacity}'$ may be used as the final predicted result. Otherwise, since it meets the condition, a new physical partition will be added, therefore, the new throughput would be calculated as $$\frac{R_{capacity}}{P} \times \text{Threshold} \times (P + 1).$$

In a third scenario, which differs from the first and second scenarios in that $R_{capacity} < R_{max} \times (P-1)$, $R_{capacity}$ can be safely increased to $R_{max} \times P$. In this case, the exact value may be calculated in a same manner as with the second scenario above.

In a fourth scenario, if the number of containers $C_{db}$ is less than or equal to the maximum number of containers $C_{max}$ for a single database and some of the containers are shared capacity containers while others are dedicated capacity containers, then the steps for the first through third scenarios may be repeated for the shared capacity containers, while the steps for the first through third scenarios may be repeated for each of the dedicated capacity containers. In a fifth scenario, which differs from the fourth scenario in that all the containers are dedicated capacity containers, then the steps for the first through third scenarios may be repeated for each container. Herein, "shared capacity" (or "shared throughput") containers may refer to containers for which the throughput is specified at the database level and is then shared with up to the maximum number of containers within the database (excluding containers that have been configured with dedicated throughput), while "dedicated capacity" (or "dedicated throughput") containers may refer to containers for which the throughput that is provisioned on the container is exclusively reserved for that container.

In a sixth scenario, if the number of containers $C_{db}$ is greater than the maximum number of containers $C_{max}$ for a single database and some of the containers are shared capacity containers while others are dedicated capacity containers, then the steps for the first through third scenarios may be repeated for the shared capacity containers, while the dedicated capacity containers should be moved to another database with the steps for the first through third scenarios may be repeated for each of the dedicated capacity containers in the other database. The containers in each database should be less than $C_{max}$. In a seventh scenario, which differs from the sixth scenario in that all the containers are dedicated capacity containers, then the steps for the first through third scenarios may be repeated for each container. The containers in each database should be less than $C_{max}$.

These and other functions of the examples 300 and 300' (and their components) are described in greater detail herein with respect to FIGS. 1, 2, and 4A-4C.

Figure 4A:
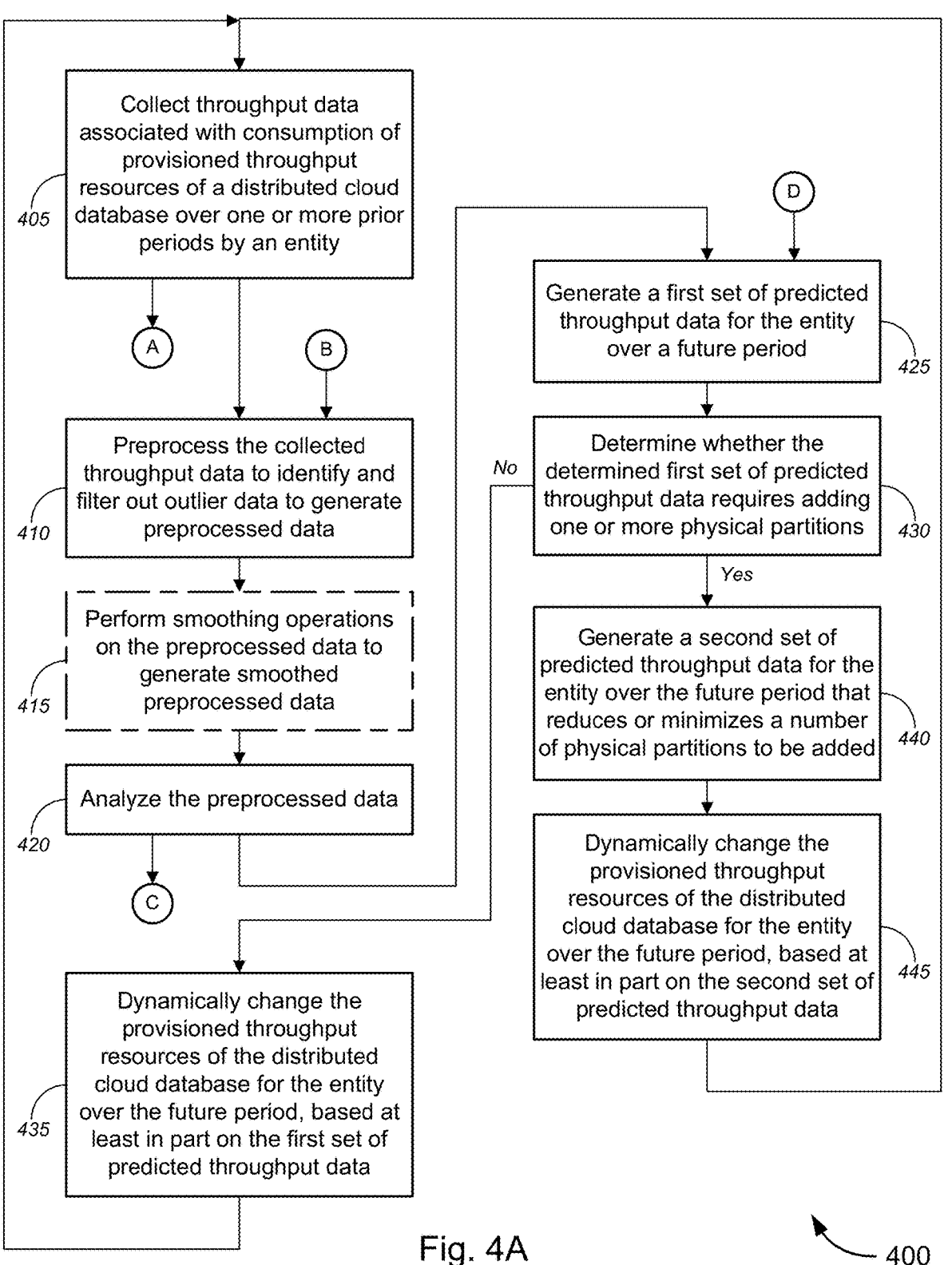

FIGS. 4A-4C depict an example method 400 for implementing cloud distributed database capacity planning and/or adjustment, using time-series data analysis, in accordance with various embodiments. Method 400 of FIG. 4A continues onto FIG. 4B following the circular marker denoted, "A," and returns to FIG. 4A following the circular marker denoted, "B." In some examples, method 400 of FIG. 4A continues onto FIG. 4C following the circular marker denoted, "C," and returns to FIG. 4A following the circular marker denoted, "D."

While the techniques and procedures are depicted and/or described in a certain order for purposes of illustration, it should be appreciated that certain procedures may be reordered and/or omitted within the scope of various embodiments. Moreover, while the method 400 illustrated by FIGS. 4A-4C can be implemented by or with (and, in some cases, are described below with respect to) the systems, examples, or embodiments 100, 200, 300, and 300' of FIG. 1, 2, 3A, and 3B, respectively (or components thereof), such methods may also be implemented using any suitable hardware (or software) implementation. Similarly, while each of the systems, examples, or embodiments 100, 200, 300, and 300' of FIGS. 1, 2, 3A, and 3B, respectively (or components thereof), can operate according to the method 400 illustrated by FIGS. 4A-4C (e.g., by executing instructions embodied on a computer readable medium), the systems, examples, or embodiments 100, 200, 300, and 300' of FIGS. 1, 2, 3A, and 3B can each also operate according to other modes of operation and/or perform other suitable procedures.

In the non-limiting embodiment of FIG. 4A, method 400, at block 405, includes collecting, by a computing system, throughput data associated with consumption of provisioned throughput resources of a distributed cloud database over one or more prior periods by an entity. Herein, "throughput resources" may refer to one or more of request units or requesting units ("RUs"), write capacity units ("WCUs"), write request units ("WRUs"), read capacity units ("RCUs"), read request units ("RRUs"), node hours, and/or the like. In some cases, the one or more prior periods may each include at least one of one week, two weeks, three weeks, four weeks, a 30-day period, one month, two months, a 60-day period, three months, a 90-day period, one annual quarter, a half year, three annual quarters, a year, a repeating interval period, and/or the like. In some embodiments, the computing system may include at least one of a provisioning computing system, a server, a cloud computing system, a distributed computing system, and/or the like.

By way of example, in some cases, the collected throughput data may include, without limitation, at least one of: throughput data for a container of the distributed cloud database that is associated with the entity; consumption data for the container that is associated with the entity; current throughput capacity configuration on the container that is associated with the entity; actual database usage percentage per minute per container that is associated with the entity; maximum aggregation of actual container usage percentage per minute that is associated with the entity; throughput data for the distributed cloud database that is associated with the entity; consumption data for the distributed cloud database that is associated with the entity; current throughput capacity configuration on a single database of the distributed cloud database that is associated with the entity; actual database usage percentage per minute per database that is associated with the entity; maximum aggregation of actual database usage percentage per minute that is associated with the entity; normalized actual throughput data for the container that is associated with the entity; normalized actual throughput data for the distributed cloud database that is associated with the entity; a number of containers in the distributed cloud database that are assigned to the entity; normalized actual throughput data for an account that is associated with the entity; a maximum throughput capacity per physical partition; and/or the like. In some examples, method 400 may continue onto the process at block 450 in FIG. 4B following the circular marker denoted, "A," before returning to the process at block 410 in FIG. 4A, as indicated by the circular marker denoted, "B."

At block 450 in FIG. 4B (following the circular marker denoted, "A," in FIG. 4A), method 400 may include identifying, by the computing system, patterns in the throughput data over the one or more prior periods, the patterns including one of weekly patterns, patterns for particular days of a week, patterns for particular hours in a day, patterns for particular weeks in a month, patterns for particular months of a year, patterns for particular annual quarters in the year, and/or the like. Method 400 may return to the process at block 410 in FIG. 4A following the circular marker denoted, "B."

At block 410, method 400 may include preprocessing, by the computing system, the collected throughput data to identify and filter out outlier data to generate preprocessed data. In some examples, identifying the outlier data may include identifying outlier data that do not fit the identified patterns (from block 450, if applicable). According to some embodiments, filtering out outlier data may include, but is not limited to, performing at least one of: minimum distance ("MD")-based filtering to compare and filter out outlier values; kernel density estimation ("KDE")-based filtering to smooth out outlier values; moving average ("MA")-based filtering to smooth out outlier values; Kalman filtering or linear quadratic estimation ("LQE")-based filtering to filter out outlier values; and/or the like.

Method 400 may further include, at optional block 415, performing, by the computing system, smoothing operations on the preprocessed data to generate smoothed preprocessed data. Method 400, at block 420, includes analyzing, by the computing system, the preprocessed data (from block 410) or the smoothed preprocessed data (from block 415, if applicable). In some instances, at least one of the analysis processes (at block 420) and/or the preprocessing or filtering processes (at block 410) may be performed using at least one machine learning algorithm, or the like.

In some examples, method 400 may continue from the process at block 420 onto the process at block 425. In other examples, method 400 may continue onto the process at block 455 in FIG. 4C following the circular marker denoted, "C," before returning to the process at block 425 in FIG. 4A, as indicated by the circular marker denoted, "D."

At block 455 in FIG. 4C (following the circular marker denoted, "C," in FIG. 4A), method 400 may include identifying, by the computing system, periods of non-use of the distributed cloud database by the entity during at least one 24-hour duration (e.g., non-use during each day, or during each of particular days in a week). Non-use may be a period of time during which there is minimal use rather than entirely no use. For instance, the non-use period may be the period where use is below a non-use threshold. Such a non-use period may occur via analysis of the historical throughput data. Method 400 may return to the process at block 425 in FIG. 4A following the circular marker denoted, "D."

At block 425, method 400 may include generating, by the computing system, a first set of predicted throughput data for the entity over a future period (e.g., an upcoming future period, such as the next 7 days or next 30 days), based on analysis of one or more of the preprocessed data (from block

410, if applicable), the smoothed preprocessed data (from block 415, if applicable), and/or the identified patterns (from block 450, if applicable), or the like.

Generating the first set of predicted throughput data may also include identifying maxima of throughput consumption of the predicted throughput data. For instance, an absolute maximum may be identified and/or a maximum may be determined for sub-periods with the future period. The sub-periods of the future period are time intervals that are less than the future period. As an example, the future period may be one week, and the sub-period may be one day. In such an example, the maximum predicted throughput consumption for each day be determined. As discussed further herein, the provisioned throughput resources may by adjusted once during each of the sub-periods (e.g., once per day) based on the maximum determined for the upcoming sub-period.

Method 400, at block 430, includes determining, by the computing system, whether the first set of predicted throughput data requires adding one or more physical partitions, which may result in lower performance if the partition had to be added in real time when the throughput exceeds the capacity of the currently provisioned partition(s) (e.g., due to a slowdown in the query process and/or due query response, or due to the warming up and/or initialization of the new partition(s)), etc.). If no additional partitions are predicted to be required, method 400 may continue onto the process at block 435. If additional partitions are predicted to be required, method 400 may continue onto the process at block 440.

At block 435, method 400 may include, based on a determination that the first set of predicted throughput data does not require adding physical partitions, dynamically adjusting, by the computing system, provisioned capacity of the distributed cloud database that is assigned to the entity—in some cases, once per sub-period (e.g., day) during one of the identified periods of non-use of the distributed cloud database by the entity—by dynamically changing the provisioned throughput resources of the distributed cloud database for the entity over the future period, based at least in part on the first set of predicted throughput data. Method 400 may return to the process at block 405.

In some examples, method 400 may further include, at block 440, based on the first set of predicted throughput data requiring adding one or more physical partitions, determining, by the computing system, a second set of predicted throughput data for the entity over the future period that reduces or minimizes a number of physical partitions to be added (thereby reducing or minimizing impact of added physical partitions). At block 445, the method 400 includes dynamically adjusting, by the computing system, provisioned capacity of the distributed cloud database that is assigned to the entity—in some cases, once per day during one of the identified periods of non-use of the distributed cloud database by the entity—by dynamically changing the provisioned throughput resources of the distributed cloud database for the entity over the future period, based at least in part on the second set of predicted throughput data (block 445). Method 400 may return to the process at block 405.

According to some embodiments, dynamically changing the provisioned throughput resources of the distributed cloud database for the entity over the future period may include changing the provisioned throughput resources that are assigned to the entity by performing at least one of: increasing a number of containers; increasing a number of logical partitions; increasing a number of physical partitions; decreasing the number of containers; decreasing the number of logical partitions; decreasing the number of physical partitions; distributing capacity across two or more logical partitions; distributing capacity across two or more physical partitions; distributing capacity across two or more physical partitions; distributing capacity across a combination of the containers, the logical partitions, and the physical partitions; and/or the like.

Figure 5:
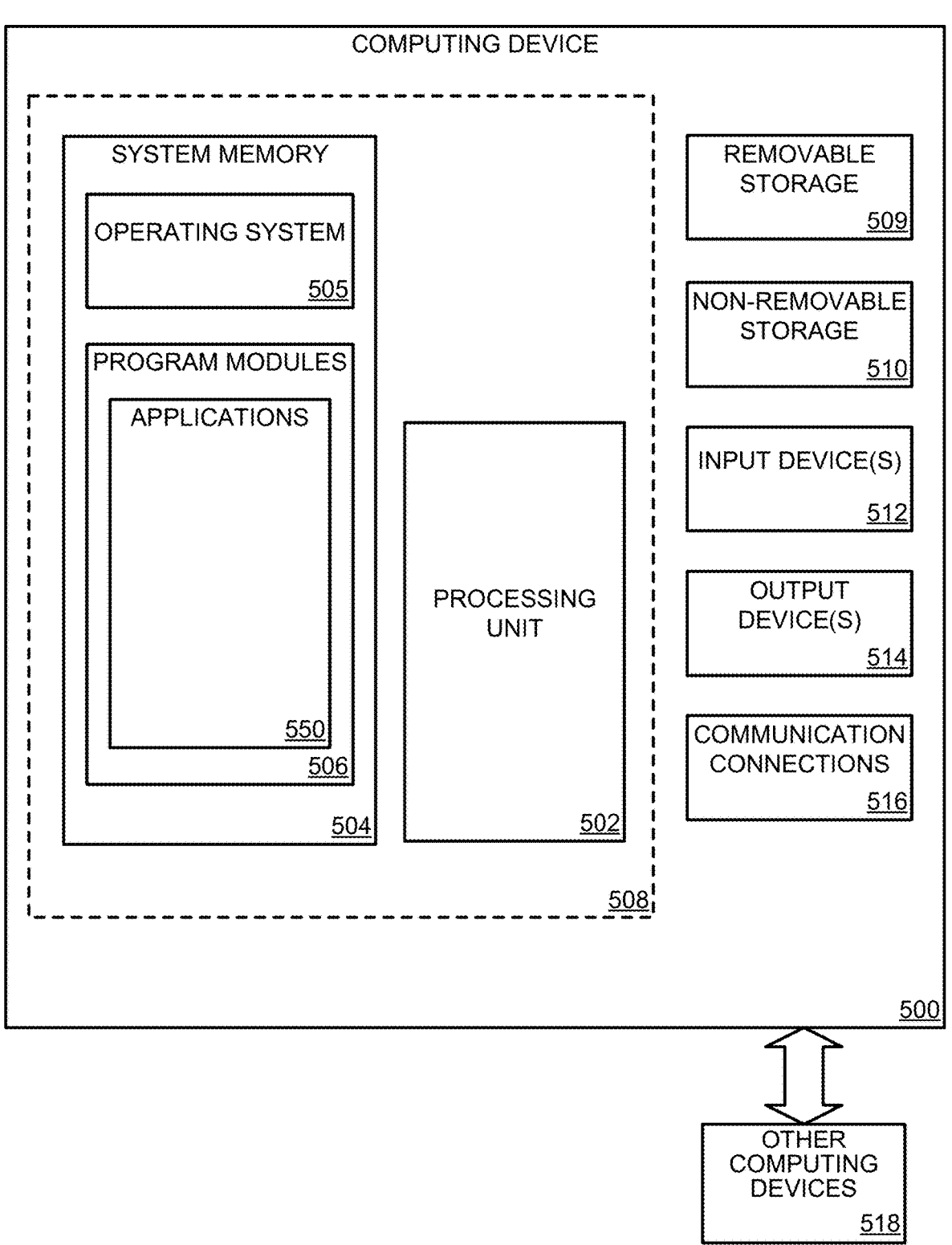
FIG. 5 is a block diagram illustrating example physical components of a computing device with which aspects of the technology may be practiced.

FIG. 5 is a block diagram illustrating physical components (i.e., hardware) of a computing device 500 with which examples of the present disclosure may be practiced. The computing device components described below may be suitable for a client device implementing cloud distributed database capacity planning and/or adjustment, using time-series data analysis, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape, etc. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including, but not limited to, one or more of the operations of the method(s) as illustrated in FIG. 4, or one or more operations of the system(s) and/or apparatus(es) as described with respect to FIGS. 1-3, or the like. Other program modules that may be used in accordance with examples of the present invention may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage, etc.). Computer storage media may include RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and does not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, provisioning cloud distributed databases generally raises multiple technical problems. For instance, one technical problem includes unused and wasted dedicated computing hardware and/or resources with implementation of provisioning methodologies in which an entity (e.g., a customer) sets the throughput capacity to a single set amount over a longer period (e.g., over a month, an annual quarter, or a year). Another technical problem includes resource and cost intensive results from implementation of automatic scaling methodologies in which a reactive mode is utilized. The present technology provides a predictive provisioning methodology that utilize predictive algorithms to identify and filter out outlier data or values in prior throughput data to better refine the results of the predictive algorithms. Provisioning of cloud distributed databases, according to the present technology, is then implemented over a shortened time scale (e.g., each day during a period of non-use) with a throughput capacity (a number of throughput data units per second) based on the predicted peak usage for each day of the week. Such predictive provisioning conserves hardware resources that may then be distributed or used for other actions, such as providing capacity to other entities, or the like.

In an aspect, the technology relates to a system for adjusting distributed cloud database capacity. The system includes at least one processor; and a computer storage medium communicatively coupled to the at least one processor. The computer storage medium has stored thereon computer software including a set of instructions that, when executed by the at least one processor, causes the system to perform operations including: based on analysis of historical throughput data associated with consumption of provisioned throughput resources of a distributed cloud database over one or more prior periods by an entity, generating a first set of predicted throughput data for the entity over a future period; identifying a maximum throughput consumption in the first set of predicted throughput data; and dynamically changing provisioned capacity of the distributed cloud database that is assigned to the entity by adjusting the provisioned throughput resources of the distributed cloud database for the entity over the future period based on the identified maximum throughput consumption.

In an example, the identified maximum is for a sub-period of the future period, and adjusting the provisioned throughput resources is performed at or during the sub-period. In another example, the historical throughput data includes at least one of: throughput data for a container of the distributed cloud database that is associated with the entity, consumption data for the container that is associated with the entity, current throughput capacity configuration on the container that is associated with the entity, actual database usage percentage per minute per container that is associated with the entity, maximum aggregation of actual container usage percentage per minute that is associated with the entity, throughput data for the distributed cloud database that is associated with the entity, consumption data for the distributed cloud database that is associated with the entity, current throughput capacity configuration on a single database of the distributed cloud database that is associated with the entity, actual database usage percentage per minute per database that is associated with the entity, maximum aggregation of actual database usage percentage per minute that is associated with the entity, normalized actual throughput data for the container that is associated with the entity, normalized actual throughput data for the distributed cloud database that is associated with the entity, a number of containers in the distributed cloud database that are assigned to the entity, normalized actual throughput data for an account that is associated with the entity, or a maximum throughput capacity per physical partition.

In still another example, the operations further include preprocessing the historical throughput data to identify and filter out outlier data to generate preprocessed data; and performing smoothing operations on the preprocessed data to generate smoothed preprocessed data. In an example, analyzing the historical throughput data includes analyzing the smoothed preprocessed data. In an example, filtering out outlier data from the analyzed collected historical throughput data includes performing at least one of: minimum distance ("MD")-based filtering to compare and filter out outlier values; kernel density estimation ("KDE")-based filtering to smooth out outlier values; moving average ("MA")-based filtering to smooth out outlier values; or Kalman filtering or linear quadratic estimation ("LQE")-based filtering to filter out outlier values. In yet another example, at least one of analyzing the collected historical throughput data or preprocessing the analyzed collected historical throughput data to identify and filter out outlier data is performed using at least one machine learning algorithm. In another example, the one or more prior periods include at least one of one week, two weeks, three weeks, four weeks, a 30-day period, one month, two months, a 60-day period, three months, a 90-day period, one annual quarter, a half year, three annual quarters, a year, or a repeating interval period. The operations further include identifying patterns in the historical throughput data over the one or more prior periods, the patterns including one of weekly patterns, patterns for particular days of a week, patterns for particular hours in a day, patterns for particular weeks in a month, patterns for particular months of a year, or patterns for particular annual quarters in the year, wherein identifying the outlier data includes identifying outlier data that exceed the identified patterns by a defined amount.

In an example, the operations further include identifying periods of non-use of the distributed cloud database by the entity during at least one 24-hour duration, wherein dynamically changing the provisioned throughput resources of the distributed cloud database for the entity over the future period is performed during one of the identified periods of non-use of the distributed cloud database by the entity. In another example, adjusting the provisioned throughput resources of the distributed cloud database for the entity over the future period includes changing the provisioned throughput resources that are assigned to the entity by performing at least one of increasing a number of containers, increasing a number of logical partitions, increasing a number of physical partitions, decreasing the number of containers, decreasing the number of logical partitions, decreasing the number of physical partitions, distributing capacity across two or more logical partitions, distributing capacity across two or more physical partitions, or distributing capacity across a combination of the containers, the logical partitions, and the physical partitions. In still another example, the operations further include: based on a determination that the determined first set of predicted throughput data requires adding one or more physical partitions, determining a second set of predicted throughput data for the entity over the future period that reduces or minimizes a number of physical partitions to be added, wherein dynamically adjusting provisioned capacity of the distributed cloud database that is assigned to the entity includes dynamically adjusting provisioned capacity of the distributed cloud database, that is assigned to the entity, by dynamically changing the provisioned throughput resources of the distributed cloud database for the entity over the future period, based at least in part on the second set of predicted throughput data.

In another aspect, the technology relates to a computer-implemented method for adjusting distributed cloud database capacity. The method includes collecting throughput data associated with consumption of provisioned throughput resources of a distributed cloud database over one or more prior periods by an entity; preprocessing the collected throughput data to identify and filter out outlier data to generate preprocessed data; based on analysis of the preprocessed data, determining a first set of predicted throughput data for the entity over a future period; and dynamically adjusting provisioned capacity of the distributed cloud database that is assigned to the entity, by dynamically changing the provisioned throughput resources of the distributed cloud database for the entity over the future period, based at least in part on the first set of predicted throughput data.

In an example, the method further includes performing smoothing operations on the preprocessed data to generate smoothed preprocessed data; and analyzing the smoothed preprocessed data, wherein analyzing the preprocessed data includes analyzing the smoothed preprocessed data. In another example, filtering out outlier data from the analyzed collected throughput data includes performing at least one of: minimum distance ("MD")-based filtering to compare and filter out outlier values; kernel density estimation ("KDE")-based filtering to smooth out outlier values; moving average ("MA")-based filtering to smooth out outlier values; or Kalman filtering or linear quadratic estimation ("LQE")-based filtering to filter out outlier values. In yet another example, at least one of analyzing the collected throughput data or preprocessing the analyzed collected throughput data to identify and filter out outlier data is performed using at least one machine learning algorithm.

In still another example, the one or more prior periods include at least one of one week, two weeks, three weeks, four weeks, a 30-day period, one month, two months, a 60-day period, three months, a 90-day period, one annual quarter, a half year, three annual quarters, a year, or a repeating interval period. In an example, the method further includes identifying patterns in the throughput data over the one or more prior periods, the patterns including one of weekly patterns, patterns for particular days of a week, patterns for particular hours in a day, patterns for particular weeks in a month, patterns for particular months of a year, or patterns for particular annual quarters in the year, wherein identifying the outlier data includes identifying outlier data from the identified patterns. In another example, the method further includes identifying periods of non-use of the distributed cloud database by the entity during at least one 24-hour duration, wherein dynamically changing the provisioned throughput resources of the distributed cloud database for the entity over the future period is performed once per day during one of the identified periods of non-use of the distributed cloud database by the entity.

In yet another example, dynamically changing the provisioned throughput resources of the distributed cloud database for the entity over the future period includes changing the provisioned throughput resources that are assigned to the entity by performing at least one of increasing a number of containers, increasing a number of logical partitions, increasing a number of physical partitions, decreasing the number of containers, decreasing the number of logical partitions, decreasing the number of physical partitions, distributing capacity across two or more logical partitions, distributing capacity across two or more physical partitions, or distributing capacity across a combination of the containers, the logical partitions, and the physical partitions. In another example, the method further includes, based on a determination that the determined first set of predicted throughput data requires adding one or more physical partitions, determining a second set of predicted throughput data for the entity over the future period that reduces or minimizes a number of physical partitions to be added, wherein dynamically adjusting provisioned capacity of the distributed cloud database that is assigned to the entity includes dynamically adjusting provisioned capacity of the distributed cloud database that is assigned to the entity, by dynamically changing the provisioned throughput resources of the distributed cloud database for the entity over the future period, based at least in part on the second set of predicted throughput data.

In yet another example, the technology relates to a computer-implemented method for adjusting distributed cloud database capacity. The computer-implemented method includes collecting, by a computing system, throughput data associated with consumption of provisioned throughput resources of a distributed cloud database over a prior period by an entity; identifying, by the computing system, patterns in the throughput data over the prior period; preprocessing, by the computing system, the collected throughput data to identify and filter out outlier data to generate preprocessed data; analyzing, by the computing system, the preprocessed data to generate predicted throughput data for the entity over a future period; identifying, for each of a plurality of sub-periods in the future period, a maximum throughput consumption in the predicted throughput data; and dynamically changing, during each of the sub-periods in the future period, provisioned capacity of the distributed cloud database that is assigned to the entity by adjusting the provisioned throughput resources of the distributed cloud database for the entity based on the identified maximum throughput consumption the particular sub-period for which the provisioned capacity is being changed. In an example, the future period is a week and the sub-period is a day.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 105$a$-105$n$, the integer value of n in 105$n$ may be the same or different from the integer value of n in 110$n$ for component #2 110$a$-110$n$, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or the like embodiments falling within the spirit of the broader aspects of the general inventive concept embodied in this application that do not depart from the broader scope of the claimed invention.

What is claimed is:

1. A system for adjusting distributed cloud database capacity, the system comprising:
  at least one processor; and
  a computer storage medium communicatively coupled to the at least one processor, the computer storage medium having stored thereon computer software comprising a set of instructions that, when executed by the at least one processor, causes the system to perform operations comprising:

based on analysis of historical throughput data associated with consumption of provisioned throughput resources of a distributed cloud database over one or more prior periods by an entity, generating a first set of predicted throughput data for the entity over a future period;
    identifying a maximum throughput consumption in the first set of predicted throughput data;
    identifying periods of use of the distributed cloud database by the entity during at least one 24-hour duration, and
    dynamically changing provisioned capacity of the distributed cloud database that is assigned to the entity by adjusting the provisioned throughput resources of the distributed cloud database for the entity over the future period, during one of the identified periods of non-use of the distributed cloud database, based on the identified maximum throughput consumption.

2. The system of claim 1, wherein the identified maximum is for a sub-period of the future period, and adjusting the provisioned throughput resources is performed at or during the sub-period.

3. The system of claim 1, wherein the historical throughput data comprises at least one of: throughput data for a container of the distributed cloud database that is associated with the entity, consumption data for the container that is associated with the entity, current throughput capacity configuration on the container that is associated with the entity, actual database usage percentage per minute per container that is associated with the entity, maximum aggregation of actual container usage percentage per minute that is associated with the entity, throughput data for the distributed cloud database that is associated with the entity, consumption data for the distributed cloud database that is associated with the entity, current throughput capacity configuration on a single database of the distributed cloud database that is associated with the entity, actual database usage percentage per minute per database that is associated with the entity, maximum aggregation of actual database usage percentage per minute that is associated with the entity, normalized actual throughput data for the container that is associated with the entity, normalized actual throughput data for the distributed cloud database that is associated with the entity, a number of containers in the distributed cloud database that are assigned to the entity, normalized actual throughput data for an account that is associated with the entity, or a maximum throughput capacity per physical partition.

4. The system of claim 1, wherein the operations further comprise:
  preprocessing the historical throughput data to identify and filter out outlier data to generate preprocessed data; and
  performing smoothing operations on the preprocessed data to generate smoothed preprocessed data;
  wherein analyzing the historical throughput data comprises analyzing the smoothed preprocessed data.

5. The system of claim 4, wherein filtering out outlier data from the analyzed collected historical throughput data comprises performing at least one of:
  minimum distance ("MD")-based filtering to compare and filter out outlier values;
  kernel density estimation ("KDE")-based filtering to smooth out outlier values;
  moving average ("MA")-based filtering to smooth out outlier values; or
  Kalman filtering or linear quadratic estimation ("LQE")-based filtering to filter out outlier values.

6. The system of claim 4, wherein at least one of analyzing the collected historical throughput data or preprocessing the analyzed collected historical throughput data to identify and filter out outlier data is performed using at least one machine learning algorithm.

7. The system of claim 4, wherein the one or more prior periods comprise at least one of one week, two weeks, three weeks, four weeks, a 30-day period, one month, two months, a 60-day period, three months, a 90-day period, one annual quarter, a half year, three annual quarters, a year, or a repeating interval period, wherein the operations further comprise:

identifying patterns in the historical throughput data over the one or more prior periods, the patterns comprising one of weekly patterns, patterns for particular days of a week, patterns for particular hours in a day, patterns for particular weeks in a month, patterns for particular months of a year, or patterns for particular annual quarters in the year;

wherein identifying the outlier data comprises identifying outlier data that exceed the identified patterns by a defined amount.

8. The system of claim 1, wherein adjusting the provisioned throughput resources of the distributed cloud database for the entity over the future period comprises changing the provisioned throughput resources that are assigned to the entity by performing at least one of increasing a number of containers, increasing a number of logical partitions, increasing a number of physical partitions, decreasing the number of containers, decreasing the number of logical partitions, decreasing the number of physical partitions, distributing capacity across two or more logical partitions, distributing capacity across two or more physical partitions, or distributing capacity across a combination of the containers, the logical partitions, and the physical partitions.

9. The system of claim 1, wherein the operations further comprise:

based on a determination that the first set of predicted throughput data requires adding one or more physical partitions, determining a second set of predicted throughput data for the entity over the future period that reduces or minimizes a number of physical partitions to be added, wherein dynamically adjusting provisioned capacity of the distributed cloud database that is assigned to the entity comprises dynamically adjusting provisioned capacity of the distributed cloud database, that is assigned to the entity, by dynamically changing the provisioned throughput resources of the distributed cloud database for the entity over the future period, based at least in part on the second set of predicted throughput data.

10. A computer-implemented method for adjusting distributed cloud database capacity, the method comprising:

collecting throughput data associated with consumption of provisioned throughput resources of a distributed cloud database over one or more prior periods by an entity;

preprocessing the collected throughput data to identify and filter out outlier data to generate preprocessed data;

based on analysis of the preprocessed data, determining a first set of predicted throughput data for the entity over a future period;

identifying periods of non-use of the distributed cloud database by the entity during at least one 24-hour duration; and dynamically adjusting provisioned capacity of the distributed cloud database that is assigned to the entity, by dynamically changing the provisioned throughput resources of the distributed cloud database for the entity over the future period, once per day during one of the identified periods of non-use the tributed cloud database based at least in part on the first set of predicted throughput data.

11. The computer-implemented method of claim 10, further comprising:

performing smoothing operations on the preprocessed data to generate smoothed preprocessed data; and analyzing the smoothed preprocessed data.

12. The computer-implemented method of claim 11, wherein filtering out outlier data from the analyzed collected throughput data comprises performing at least one of:

minimum distance ("MD")-based filtering to compare and filter out outlier values;

kernel density estimation ("KDE")-based filtering to smooth out outlier values;

moving average ("MA")-based filtering to smooth out outlier values; or

Kalman filtering or linear quadratic estimation ("LQE")-based filtering to filter out outlier values.

13. The computer-implemented method of claim 11, wherein at least one of analyzing the collected throughput data or preprocessing the analyzed collected throughput data to identify and filter out outlier data is performed using at least one machine learning algorithm.

14. The computer-implemented method of claim 10, wherein the one or more prior periods comprise at least one of one week, two weeks, three weeks, four weeks, a 30-day period, one month, two months, a 60-day period, three months, a 90-day period, one annual quarter, a half year, three annual quarters, a year, or a repeating interval period, wherein the method further comprises:

identifying patterns in the throughput data over the one or more prior periods, the patterns comprising one of weekly patterns, patterns for particular days of a week, patterns for particular hours in a day, patterns for particular weeks in a month, patterns for particular months of a year, or patterns for particular annual quarters in the year;

wherein identifying the outlier data comprises identifying outlier data from the identified patterns.

15. The computer-implemented method of claim 10, wherein dynamically changing the provisioned throughput resources of the distributed cloud database for the entity over the future period comprises changing the provisioned throughput resources that are assigned to the entity by performing at least one of increasing a number of containers, increasing a number of logical partitions, increasing a number of physical partitions, decreasing the number of containers, decreasing the number of logical partitions, decreasing the number of physical partitions, distributing capacity across two or more logical partitions, distributing capacity across two or more physical partitions, or distributing capacity across a combination of the containers, the logical partitions, and the physical partitions.

16. The computer-implemented method of claim 10, further comprising:

based on a determination that the determined first set of predicted throughput data requires adding one or more physical partitions, determining a second set of predicted throughput data for the entity over the future period that reduces or minimizes a number of physical partitions to be added, wherein dynamically adjusting provisioned capacity of the distributed cloud database that is assigned to the entity comprises dynamically adjusting provisioned capacity of the distributed cloud database that is assigned to the entity, by dynamically changing the provisioned throughput resources of the distributed cloud database for the entity over the future period, based at least in part on the second set of predicted throughput data.

17. A computer-implemented method for adjusting distributed cloud database capacity, comprising:

collecting, by a computing system, throughput data associated with consumption of provisioned throughput resources of a distributed cloud database over a prior period by an entity;

identifying, by the computing system, patterns in the throughput data over the prior period;

preprocessing, by the computing system, the collected throughput data to identify and filter out outlier data to generate preprocessed data;

analyzing, by the computing system, the preprocessed data to generate predicted throughput data for the entity over a future period;

identifying, for each of a plurality of sub-periods in the future period, a maximum throughput consumption in the predicted throughput data;

identifying periods of non-use of the distributed cloud database by the entity during at least one 24-hour duration; and dynamically changing, during each of the sub-periods in the future period, provisioned capacity of the distributed cloud database that is assigned to the entity by adjusting the provisioned throughput resources of the distributed cloud database for the entity, during one of the identified periods of non-use of the distributed cloud data based on the identified maximum throughput consumption the particular sub-period for which the provisioned capacity is being changed.

18. The method of claim 17, wherein the future period is a week and the sub-period is a day.

* * * * *